2 Sheets—Sheet 1.

H. C. WINGLER & W. W. STOUGH.
Jump-Seat for Vehicles.

No. 204,932. Patented June 18, 1878.

Witnesses

Inventors
Henry C. Wingler
Will. W. Stough
Per Wm. R. Singleton
Atty.

2 Sheets—Sheet 2.

H. C. WINGLER & W. W. STOUGH.
Jump-Seat for Vehicles.

No. 204,932. Patented June 18, 1878.

Witnesses  
Inventors  
Henry C. Wingler  
Will. W. Stough  
Per Wm. R. Singleton  
Atty.

UNITED STATES PATENT OFFICE.

HENRY C. WINGLER AND WILL W. STOUGH, OF SHIPPENSBURG, PA.

IMPROVEMENT IN JUMP-SEATS FOR VEHICLES.

Specification forming part of Letters Patent No. 204,932, dated June 18, 1878; application filed May 20, 1878.

*To all whom it may concern:*

Be it known that we, HENRY C. WINGLER and WILL W. STOUGH, of Shippensburg, in the county of Cumberland and State of Pennsylvania, have invented certain new and useful Improvements in Jump-Seats; and we do hereby declare that the following is a full, clear, and exact description thereof, which will enable others skilled in the art to which it appertains to make and use the same, reference being had to the accompanying drawings, and to letters of reference marked thereon, which form a part of this specification, in which—

Figure 1:
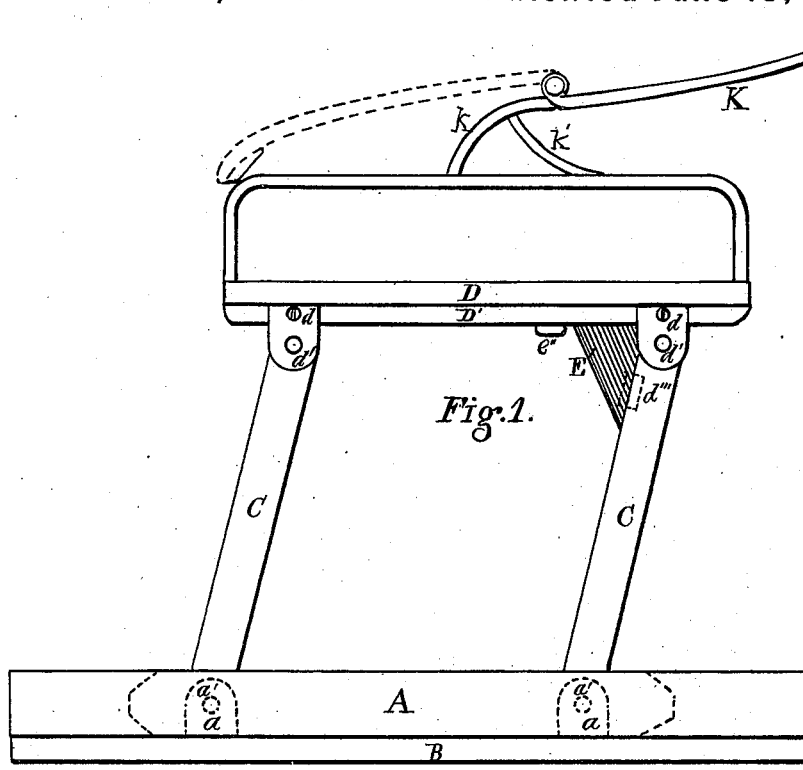
Figure 2:
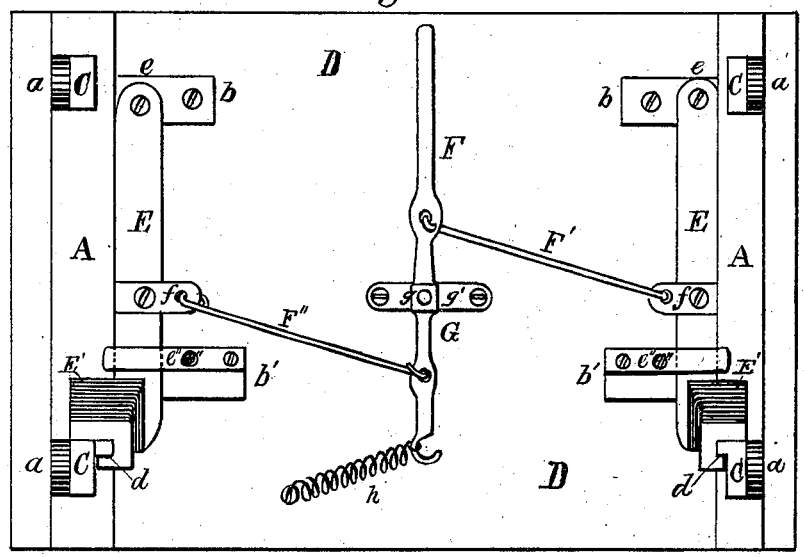
Figure 3:
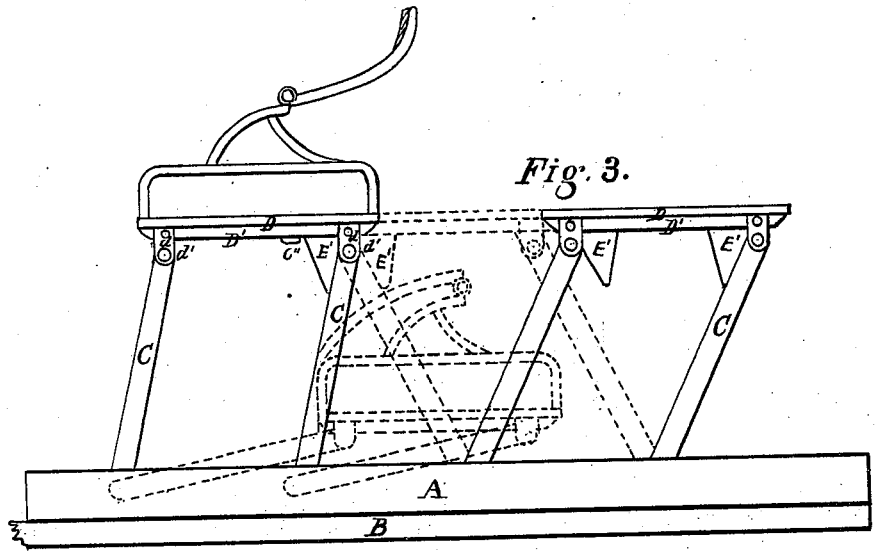
Figures 4, 5:
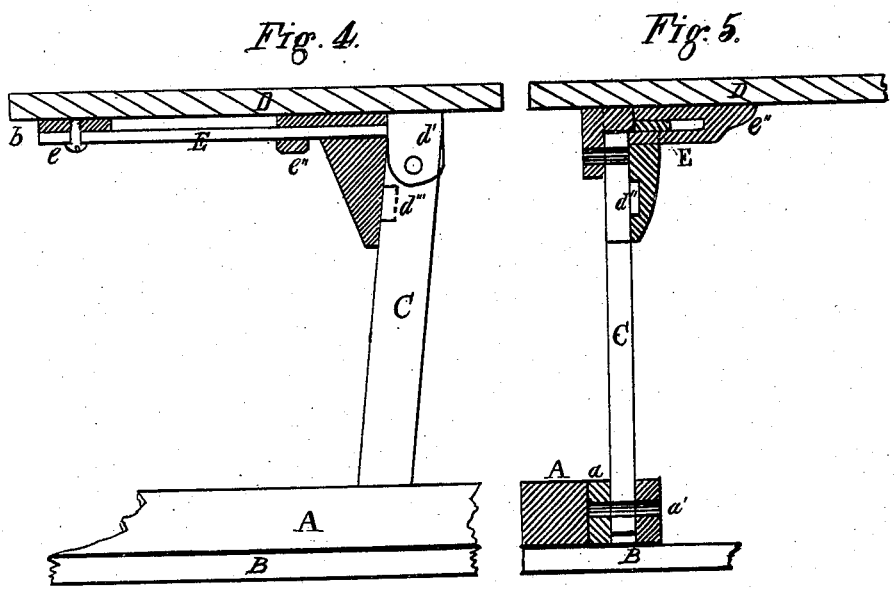

Figure 1 is an end view of the seat. Fig. 2 is an under-side view of the seat turned over, showing the locking devices. Fig. 3 is a side view of two seats. Figs. 4 and 5 are details of the locking device.

This invention relates to improvements in the devices for locking the seats of vehicles which are known as "jump-seats;" and consists in the combination of a brace or bracket having within it a recess, and the legs or standards which support the seats, having upon one edge thereof a lug to be held by the recess, thus sustaining by the brace itself the weight of the seat, and by the lug held by the recess the seat is prevented from tilting forward either from a sudden stoppage of the vehicle or when descending steep hills, as is often the case when the ordinary braces are used, all of which will be more fully hereinafter described.

A represents the frame of a vehicle. B is the bottom board or floor. C C are standards, which are pivoted to the frame A by lugs $a$ $a$ and pins $a'$ $a'$; and D is the seat, attached to the standards or legs C C by pivoted connections $d$ $d$ and pins $d'$ $d'$, attached to the bottom of the seat D by cleats D'.

E E are levers, one on each side, pivoted at $e$ $e$ to cleats $b$ $b$, fastened to the seat-board D. On these levers E E are cleats or loops $f$ $f$, to which are attached connecting-rods F' F'', the other ends of which being attached to a central lever, F, pivoted at G to the bottom of the seat D by a bolt, $g$, and strap $g'$.

To the rear end of lever F is attached a spring, $h$, which keeps the lever F in its proper position for locking the seat.

At the ends of the levers E are blocks or brackets E' E', having a notch or recess, $d''$, on the side facing the standards C C, and their edges beveled to suit the angle at which the standards are to rest when the seat is in proper position, as in Fig. 1. Then the lugs $d'''$ on the edges of standards C C will fit into the notches $d''$ $d''$ of the bracket, the purpose of which lugs and notches is to prevent the seat from moving forward either from a sudden stoppage of the vehicle or when descending a steep hill.

The lever F, by the connecting-rods F' F'', when moved, will pull the levers E E inwardly and unlock the standards C C, when the seat can be lowered in either direction, as shown in Fig. 3, under the hind seat, which is tilted forward from its position when two seats are used.

In Fig. 3 the front and hind seat are shown in solid lines when both are in use. When one only is to be used, the front seat is lowered into the position shown in broken lines, and the back seat is tilted forward, as seen also in broken lines, and then it will cover the front seat.

The back of the front seat is made with a hinge-joint, and can be reversed, as shown in Figs. 1 and 3.

To support the lower section of the hinged back, a brace, $k'$, is placed rearward from the arm $k$ to support the back-piece K.

We claim—

1. In jump-seats for vehicles, a bracket-piece beveled to support the seat-standard in one direction, and having on one edge a recess, in combination with the seat-standard provided with a projecting lug, substantially as described.

2. The lever E, pivoted at one end, and having at the other end a supporting-bracket provided with a locking-recess, in combination with the seat-standard provided with a projecting lug, substantially as described.

In testimony that we claim the foregoing as our own we hereto affix our signatures in presence of two witnesses.

HENRY C. WINGLER.
WILL W. STOUGH.

Witnesses:
T. H. N. McPHERSON,
ISAAC B. HYMER.